Figure 1:
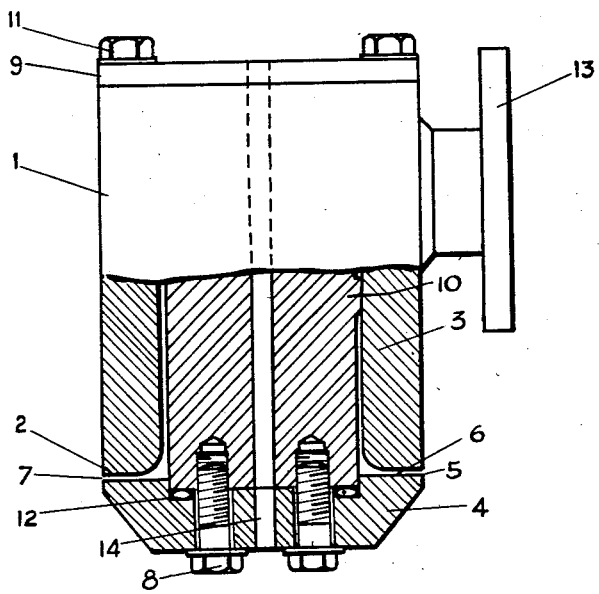

Sept. 20, 1960   R. H. B. BUTEUX ET AL   2,952,872
PRODUCTION OF FILM
Filed Jan. 28, 1955

INVENTORS
RICHARD HAROLD BARCLAY BUTEUX
JOHNSON RALPH CANN
JACK WITHERINGTON CORNFORTH

BY Cushman, Darby & Cushman
ATTORNEYS

2,952,872

PRODUCTION OF FILM

Richard Harold Barclay Buteux and Johnson Ralph Cann, Welwyn Garden City, and Jack Witherington Cornforth, Harpenden, England, assignors to Imperial Chemical Industries Limited, London, England, a corporation of Great Britain Filed Jan. 28, 1955, Ser. No. 484,795

Claims priority, application Great Britain Feb. 8, 1954

4 Claims. (Cl. 18—14)

This invention relates to the production of film, and more particularly to the production of film in tubular form from synthetic organic thermoplastic materials.

Because of the small thickness variation that can be tolerated in tubular film and the good surface finish required for most applications, it is necessary that dies used for the production of such film by melt extrusion should be capable of producing a tube within close limits of thickness variation, and that they should have smooth extrusion surfaces. The first of these requirements is important irrespective of the material being extruded; the second is particularly important for the extrusion of low viscosity melts, for example of the linear high molecular weight polyamides and polyesters, particularly polyethylene terephthalate, whose appearance and mechanical properties may very easily be spoiled even by small imperfections imparted by the extrusion surfaces. The die surfaces, which must define a very narrow extrusion channel, are easily damaged in assembling the apparatus and in the extrusion process; for example, they are easily scratched by particles of dust or by other solid particles that may be present in the molten polymer.

Dies used hitherto for the production of tubular film have had cylindrical or conical surfaces, and such dies have two inherent disadvantages: firstly, it is difficult to provide and maintain truly cylindrical extrusion surfaces having a high degree of smoothness; and secondly, it is difficult to provide means of adjustment in the width of the die orifice over a small length of its periphery without altering the width of the remainder of the orifice. For the extrusion of high viscosity melts, the latter difficulty can be largely overcome by such methods as differentially cooling the extruded tube, or differentially heating the die, round the circumference thereof, to compensate for differences in flow of the material round the die; the former difficulty is less critical for high viscosity melts since a lower standard of surface smoothness than that required for low viscosity melts can be tolerated, and the cylindrical or conical surfaces can be produced to the necessary standard of smoothness. For low viscosity melts, however, it is necessary to maintain a high degree of smoothness of the extrusion surfaces, and it is difficult to maintain this smoothness by polishing and at the same time keep the surfaces truly cylindrical and concentric. Moreover, we have not found it possible to grind and polish a cylindrical or conical surface to the degree of smoothness required for the melt extrusion of low viscosity melts to form tubular film of excellent surface quality. The variation in flow of the melt at different points round the die orifice is less easily corrected by differential heating or cooling in melts of low viscosity.

It is an object of the present invention to provide an improved process and apparatus for the melt extrusion of tubular film, in which smooth extrusion surfaces can easily be provided and maintained. It is a further object to provide such apparatus for the melt extrusion of tubular film in which the width of the die orifice is locally adjustable over small sections of its circumference.

In accordance with the present invention, an improved process for the production of film in tubular form comprises extruding a synthetic organic thermoplastic material in the molten state through the peripheral orifice of an annular extrusion channel formed between the substantially plane, horizontal, parallel surfaces of an annular die, which terminates with an annular, substantially plane extrusion surface perpendicular to its axis, and an opposed die or die plate which has no permanently fixed projections beyond the plane of its extrusion surface.

The said opposed die or die plate is preferably a plate or other component which is detachably mounted on a core positioned within the annular die, the annular outer region of the surface of the plate or other component forming the extrusion surface opposite to and substantially parallel with that of the annular die.

The extrusion surfaces used in the process of this invention, being flat surfaces with no fixed projections, may easily be ground, for example by optical grinding methods, and the smoothness of surfaces accidentally scratched may thus be easily restored.

In accordance with a further feature of our invention, apparatus for the production of film in tubular form by the extrusion of a thermoplastic material in the molten state comprises a die assembly and means for continuously supplying molten thermoplastic material under pressure thereto, said die assembly comprising an annular die terminating with an annular plane extrusion surface perpendicular to its axis, and an opposed die or die plate having a plane extrusion surface, said extrusion surfaces being capable of together forming between them a parallel walled, annular extrusion channel having a peripheral orifice, and said die or die plate having no fixed projections beyond the plane of said extrusion surface.

The die assembly preferably comprises an outer, annular die terminating with an annular, plane extrusion surface perpendicular to the axis of the die; a core contained within the outer die and forming therewith a tubular channel for the molten material; and detachably mounted on the end of said core a plate or like component which provides an annular, plane extrusion surface opposite to and parallel with that of the outer die and forming therewith an annular extrusion channel terminating in an annular orifice, said plate or like component having no permanently fixed projections beyond the plane of its annular extrusion surface.

One form of the preferred apparatus suitable for operating the process of this invention is shown diagrammatically in Figure 1 of the accompanying drawings, in which: 1 is the outer, annular die having an annular, horizontal extrusion surface, 2; and 3 is the core of the extrusion head, on which is mounted the die plate, 4. This die plate has an annular, horizontal extrusion surface, 5, which forms with the extrusion surface of the outer die the annular extrusion channel, 6. 7 is the peripheral orifice of the extrusion channel; and 8 are bolts (four in number) joining the die plate to the core of the extrusion head. This core is integral with the flange, 9, and slides into the outer die, being held centrally therein by lugs, 10. 11 are bolts joining the core to the outer die; 12 is a ring of resilient material which seals the joint between the core and the die plate, and prevents leakage of the molten polymer; 13 is a flange connecting the die assembly to an extruder by which thermoplastic material in the molten state may be continuously extruded through the die assembly; and 14 is a passage through which air or other gas may be passed.

Ideally, the two extrusion surfaces are perfectly plane and parallel with each other; but in practice it is found to be advantageous to provide means for slightly adjusting the width of the extrusion orifice at points round its circumference, to compensate for slight local variations in the flow or temperature and viscosity of the molten material. This may be done, for example, by providing one of the dies with a slightly flexible lip bearing the extrusion surface, with means spaced around the lip to adjust it locally towards or away from the opposite extrusion surface.

Figure 2:
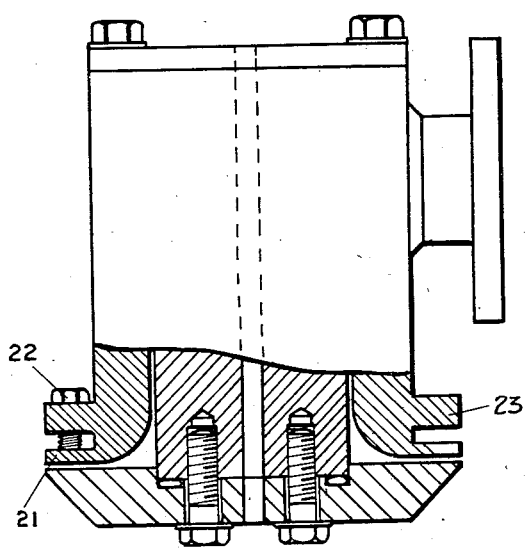

Thus, in Figure 2 is shown diagrammatically a modification of the apparatus shown in Figure 1, in which the outer die is provided with a slightly flexible lip, 21. This lip projects beyond the main body of the die and may be adjusted towards or away from the extrusion surface of the die plate by means of a plurality of bolts or differential screws, 22, acting through the circular projection 23. The bolts or screws 22 are evenly spaced around the circumference of the die, and they may be separately adjusted around the die to ensure that the finished film is of uniform thickness all round its circumference.

Adjustment in the width of the extrusion orifice in apparatus as shown in the accompanying drawings, to compensate for the material removed from the die surfaces when these are ground to restore their smoothness, may be made by means of the bolts 8 and if necessary by grinding the bottom face of the core, 3. Allowance for grinding the die surfaces may also be made by initially placing washers between the contacting horizontal surfaces of the core die parts, these washers being removed as necessary. The same methods may be used to adjust the width of the extrusion orifice in accordance with the thickness of the film required.

The total depth of metal which may be removed from the annular die and the core die or die plate by grinding may by suitable adjustment be as great as the depth through which the outer diameter of the dies remains constant. For the core die or die plate, this depth preferably does not exceed 1/10 inch, or fouling by the molten thermoplastic material may occur. Even when, after continued grinding of the extrusion surfaces in the preferred apparatus of this invention, it becomes necessary to replace the die plate, the cost of this replacement is negligible in comparison with the continual replacement of a die having a cylindrical or conical extrusion surface, of the type used hitherto in the extrusion of tubular film. If desired, the extrusion surface of the annular die may also be the surface of a replaceable flat plate or like component, in this case of annular form, detachably mounted by a leak-proof joint upon the main body of the annular die.

In operation of the process of this invention, the thermoplastic material first extruded falls clear of the outer surface of the core die because of the speed with which it emerges. The extruded material is cooled to the solid state as quickly as possible, and when a complete tube of film is being extruded the tube may be collapsed at a suitable distance from the die and passed to a wind-up roll. The speed of extrusion prevents the molten material from fouling the external surface of the core die, even in the absence of inflating pressure (beyond that which is enclosed when the film is collapsed) within the tubular film. If desired, however, additional pressure may be introduced through the passage 14 of the apparatus shown in the accompanying drawings; for example, this may be done to inflate the film to a greater diameter than results merely from the speed of extrusion.

The best method to be used for cooling the extruded tubular film will depend on the nature of the thermoplastic material used. For materials that give a very mobile melt, such as polyethylene terephthalate, it is preferred to quench the film by passing it downwards into contact with a cooling liquid, preferably water.

A particularly suitable method for cooling the extruded tubular film by means of a cooling liquid, and at the same time ensuring that the film is accurately centred and uniformly cooled, is described in our copending Serial No. 446,124, filed July 27, 1954, now Pat. No. 2,863,172. This method consists of passing the tubing downwards into and through a passageway which, at least at its entrance, is of substantially circular cross section, and whose walls are interiorly bathed with a downwardly flowing cooling liquid, such as water, which contacts and cools the whole of the external surface of the tubing as it passes through the passageway. The cooling liquid is preferably supplied continuously from a body of liquid which surrounds and chills the outer surface of the passageway. When this method is used for cooling the film extruded by the process of the present invention, the diameter of the passageway is preferably greater than the outer diameter of the die at the extrusion orifice, and the cooler may be placed initially centrally below the orifice and at a convenient distance therefrom. The material initially extruded is then passed downwards through the passageway and when the material is being uniformly extruded all round the die the cooler may be gradually raised to a position closer to the orifice; it may, if desired, be raised until it surrounds the orifice and the exthruded material issues outwards from the extrusion orifice directly on to the water-bathed wall of the passageway. The cooler may, however, be held in a position below the extrusion orifice, and the extruded film passed downwards over this distance, without support, into the entrance of the passageway. The maximum space that be left between the extrusion orifice and the cooler depends upon the viscosity of the material being extruded; for example, a gap of about ½ inch may be left if polyethylene terephthalate is being extruded, whereas film formed of more viscous melts may be carried without support over much longer spaces. When the space between the cooler and the extrusion orifice is sufficiently great, the diameter of the cooling passageway may actually be equal to or slightly less than the extrusion diameter of the die, provided that the take-off speed of the film exceeds the speed of extrusion sufficiently to allow a corresponding reduction in diameter of the tubular film.

When melts of high viscosity, for example of polythene, are being extruded it is not necessary to provide apparatus for water cooling, since the film may be adequately cooled by air, for example by jets of cold air uniformly applied around the circumference of the film. In such cases the die assembly may quite conveniently be directed vertically upwards and the film taken from the extruder in this direction.

Variations in width of the orifice or flow of the polymer round the die of the apparatus shown in the accompanying drawings may be corrected by adjustment of the bolts 8, acting against the pressure ring 12 and, in the apparatus of Figure 2, by adjustment of the bolts 22. Residual variations in the thickness of the extruded film caused by variations in the flow of material at different points round the die may also be corrected, if desired, by differentially heating the die about the annular orifice.

Variations in the overall thickness of the film may be brought about by altering the speed of haul-off while maintaining a constant speed of extrusion; the speed of haul-off should however always be great enough to prevent sagging and consequent folding of the film. It will be appreciated that instead of the extruder mentioned hereinbefore, any other suitable means may be used for supplying molten polymer continuously to the die assembly. For example, a gear pump or metering pump, supplied with molten polymer from a melt kettle, may be used.

Flat film may be produced by splitting the tubular film made by the process of this invention.

Our invention is illustrated but in no way limited by the following examples.

Example I

An extruder and die assembly as shown in Figure 1 of the accompanying drawings, with a cooler of the type described hereinbefore and in Serial No. 446,124, filed July 27, 1954, now Patent No. 2,863,172 was used for the extrusion of tubular film of polyethylene terephthalate, of average molecular weight 10,000. The extrusion orifice extended round a circle of diameter 3.98 inches and was adjusted to a width of 0.008 inch, and the polymer was extruded at a temperature at the lips of the die of 295° C. and a rate of 60 lb./hour. The cooler had an internal diameter of 4 inches (after allowing 0.005 inch for the water flowing down its surface) and when uniform extrusion of the polymer had been established the cooler was gradually raised until it was ⅛ inch below the extrusion orifice. Cold water flowed down the wall of the cooler at a rate of 2.2 litres/minute. After emerging from the passageway of the cooler, the film was gradually collapsed by a pair of flat, converging plates of polished metal and finally by a pair of driven nip rolls, from which it passed to a wind-up roll.

This process as described or with slight modifications was operated intermittently over a long period by means of the same apparatus, the extrusion surfaces of the dies being ground when necessary to remove scratches. Over the whole period a total thickness of 0.02 inch had been removed from the extrusion surface of the core die, and a similar amount from the outer die, but film of excellent quality was still being produced.

By suitable adjustment of the speed of the driven nip rolls, and hence of the haul-off speed of the film, the film was produced in thicknesses of 0.002 inch and 0.008 inch. This film was later to be cold drawn to orient it and to reduce its thickness to about one tenth of its original value; at such thicknesses, even slight markings on the surfaces of the film could not be tolerated.

Example II

The process described in Example I was used for the production of film from polythene of average molecular weight 18,000, with the following modifications: the extrusion orifice was adjusted to a width of 0.04 inch, by the insertion of a 0.032 inch washer beneath the bottom face of part 3 of the core die; the temperature at the lips of the die was 150° C.; the haul-off speed was adjusted to give film 0.005 inch thick; and instead of the water cooler a ring air cooler, designed to blow air uniformly on to the tubular film at all points round its circumference, was used to chill the film. Because of the greater final thickness of the film (which was not to be cold drawn) some slight marking of the surface could be tolerated; damage to the surfaces of the extrusion channel therefore had a less serious effect on this film than in the case of Example I, and less frequent grinding of the surface was needed. The main advantage of the process was therefore in the ease with which film of widely differing thicknesses could be produced by using washers of different thicknesses in the core die, as well as by varying the haul-off speed.

We claim:
1. Die extrusion apparatus for the extrusion of molten thermoplastic material in tubular form comprising an annular outer housing member terminating in an annular planar flat-ground extrusion surface, the plane of said surface being perpendicular to the axis of said housing member, an inner core member arranged axially within said housing member, said core member and said housing member defining a channel therebetween, an annular plate member also having an annular planar, flat-ground extrusion surface, said housing member and said plate member having no fixed projections extending beyond said flat-ground extrusion surfaces, said plate member and said housing member being arranged with said flat-ground extrusion surfaces opposed and parallel to each other, said opposed extrusion surfaces defining a radial extrusion channel directly communicating with said first-mentioned channel and terminating in an annular orifice.

2. The apparatus of claim 1, wherein said annular plate member is detachably mounted upon said inner core member.

3. Apparatus of claim 1, wherein one of said flat-ground extrusion surfaces is provided with means for adjusting said surfaces relative to the opposed extrusion surface at a plurality of points around said radial extrusion channel, whereby the width of the orifice of said channel may be varied at said points.

4. A die head for the extrusion of organic thermoplastic sheet comprising an internally cylindrical housing adapted to serve as an extension of a means for supplying fused plastic matter continuously, an internal core coaxial with said housing and fixedly spaced therefrom to provide a passageway therebetween of annular cross-section and to distribute plastic matter substantially uniformly about said passageway, and a crown member secured to and spanning said core and coaxial therewith, a plurality of adjustable pressure and tension means for altering controllably the orifice spacing between any portion of the inner circumferential face of the crown and the proximal opposed face of the housing, at least one of the core and crown members serving to divert the plastic matter from its longitudinal flow through the said annular passageway to a circumferentially radial orifice between a face of said member and the end of the said housing distant from the plastics supply means.

References Cited in the file of this patent

UNITED STATES PATENTS

| | | |
|---|---|---|
| 2,479,804 | Bailey et al. | Aug. 23, 1949 |
| 2,529,897 | Bailey et al. | Nov. 14, 1950 |
| 2,545,300 | Nixon | Mar. 13, 1951 |
| 2,688,154 | Huckfeldt | Sept. 7, 1954 |
| 2,688,766 | Huckfeldt | Sept. 14, 1954 |
| 2,753,596 | Bailey | July 10, 1956 |
| 2,769,200 | Longstretch et al. | Nov. 6, 1956 |